(12) United States Patent
Watanabe et al.

(10) Patent No.: US 8,296,586 B2
(45) Date of Patent: Oct. 23, 2012

(54) ELECTRONIC DEVICE HAVING EFFICIENT POWER SUPPLY CAPABILITY

(75) Inventors: Hideki Watanabe, Ome (JP); Katsuhiro Uchida, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 967 days.

(21) Appl. No.: 11/961,908

(22) Filed: Dec. 20, 2007

(65) Prior Publication Data
US 2008/0307239 A1 Dec. 11, 2008

(30) Foreign Application Priority Data
Jun. 7, 2007 (JP) .................................. 2007-151992

(51) Int. Cl.
*G06F 1/00* (2006.01)
(52) U.S. Cl. ........................................................ 713/300
(58) Field of Classification Search .................. 713/300
See application file for complete search history.

(56) References Cited

U.S. PATENT DOCUMENTS

| | | | | |
|---|---|---|---|---|
| 5,983,354 | A * | 11/1999 | Poisner et al. | 713/320 |
| 6,448,672 | B1 * | 9/2002 | Voegeli et al. | 307/52 |
| 7,254,727 | B2 * | 8/2007 | Yoshiyama et al. | 713/320 |
| 2003/0009614 | A1 | 1/2003 | Fujii et al. | |
| 2004/0210793 | A1 * | 10/2004 | Chokshi et al. | 714/5 |
| 2007/0104302 | A1 * | 5/2007 | Henrion | 375/354 |

FOREIGN PATENT DOCUMENTS

| | | | |
|---|---|---|---|
| JP | 2002-149291 A | * | 5/2002 |
| JP | 2002149291 | | 5/2002 |
| JP | 2002-351585 A | * | 6/2002 |
| JP | A-2002-183076 | | 6/2002 |
| JP | 2002259069 | | 9/2002 |
| JP | A-2002-351585 | | 12/2002 |
| JP | A-2003-0444422 | | 2/2003 |
| JP | 2005099927 | | 4/2005 |
| JP | 2006-211500 | | 8/2006 |

OTHER PUBLICATIONS

Japanese Patent Application No. 2007-151992, Notice of Reason for Refusal, mailed Apr. 12, 2011, (English Translation).
Japanese Patent Application No. 2007-151992, Decision of Refusal, mailed Dec. 6, 2011, (with English Translation).

* cited by examiner

*Primary Examiner* — Mohammed Rehman
(74) *Attorney, Agent, or Firm* — Blakely, Sokoloff, Taylor & Zafman LLP (57) ABSTRACT

According to one embodiment, an electronic device includes: a switch which switches between connection and disconnection of a sideband signal transmitted by a device attached to the electronic device; a power switch circuit which switches between supply and interrupt of power to the device; a non-volatile memory which holds a setting; and a control section which controls the switch and the power switch circuit based on the setting.

9 Claims, 7 Drawing Sheets

| STATUS OF POWER CONTROL LINE | POWER OF WIRELESS LAN |
|---|---|
| L | ON |
| H | OFF |

FIG. 4B

| STATUS OF SIGNAL CONTROL LINE | SIDEBAND SIGNAL | RESET |
|---|---|---|
| L | DISCONNECTED | ENABLED |
| H | CONNECTED | DISABLED |

FIG. 5B

ELECTRONIC DEVICE HAVING EFFICIENT POWER SUPPLY CAPABILITY

CROSS-REFERENCE TO RELATED APPLICATIONS

This application is based upon and claims the benefit of priority from Japanese Patent Application No. 2007-151992, filed Jun. 7, 2007, the entire contents of which are incorporated herein by reference.

BACKGROUND

1. Field one embodiment of the invention relates to an electronic device and a power supply method.

2. Description of the Related Art

An electronic device, which shuts off auxiliary power supplied to a mini peripheral component interconnect (PCI) card in a quiescent state, is disclosed by, for example, JP-A-2002-351585.

The electronic device is a personal computer (PC) equipped with a mini PCI device; and has an I/O bridge for outputting quiescent information as to whether or not the PC is in a quiescent state and a register for holding information about whether or not auxiliary power is supplied to the mini PCI device.

When the PC is in a quiescent state and when the information held in the register is set so as not to supply auxiliary power, the electronic device of JP-A-2002-351585 does not supply auxiliary power to the mini PCI device. Hence, the power that is consumed by the PC in a quiescent state can be reduced.

However, according to the electronic device, auxiliary power is not supplied to the mini PCI card when the electronic device is in a quiescent state. However, when the electronic device is activated, auxiliary power is supplied even when the mini PCI card is not used. Therefore, when an unused mini PCI device is provided in the electronic device, a problem of unwanted power consumption arises.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an electronic device includes: a switch which switches between connection and disconnection of a sideband signal transmitted by a device attached to the electronic device; a power switch circuit which switches between supply and interrupt of power to the device; a nonvolatile memory which holds a setting; and a control section which controls the switch and the power switch circuit based on the setting. Further, according to another embodiment of the invention, an electronic device includes: a switch which switches between connection and disconnection of a sideband signal transmitted by a device attached to the electronic device; a power switch circuit which switches supply and interrupt of power to the device; a nonvolatile memory which holds a setting; and a control section which controls the switch and the power switch circuit based on the setting at power-on of the electronic device. Further, according to another embodiment of the invention, a power supply method includes: reading setting held in nonvolatile memory; disabling communication between an I/O controller hub and the device when the setting is a setting for disabling the device; disconnecting a sideband signal of the device; and interrupting a power supply to the device.

An embodiment of the present invention is described in detail hereunder by reference to the drawings.

Figure 1:
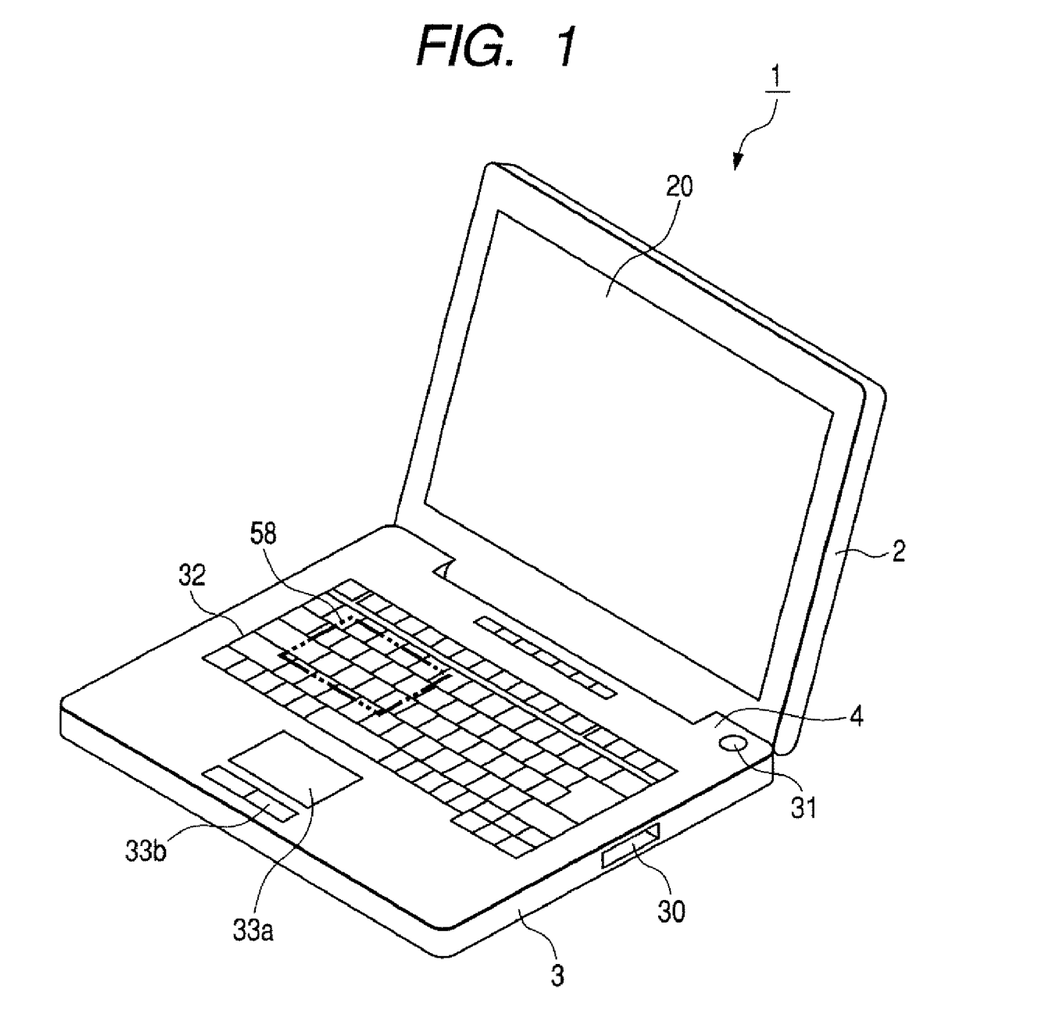
FIG. 1 is a schematic view showing a PC which serves as an electronic device of an embodiment of the present invention.

FIG. 1 is a schematic view showing a PC which serves as electronic device of an embodiment of the present invention.

A PC 1 includes an upper housing 2 having a display section 20 formed from an liquid-crystal display (LCD) and a lower housing 3 for accommodating devices, such as a central processing unit (CPU) and an hard disc drive (HDD). The upper housing 2 and the lower housing 3 are rotatably connected together by means of a hinge section 4. The lower housing 3 has a Mini PCI Express slot 30 which allows insertion and electrical connection of a device card complying with the Mini PCI Express; a power switch 31 for turning on the power of the PC 1; a keyboard 32 which allows inputting of characters, such as alphanumerics and symbols; and a track pad 33a by way of which a cursor, or the like, appearing on the display section 20 is operated and an Enter switch 33b. Further, a wireless local area network (LAN) card 58 to be connected in accordance with PCI Expression (hereinafter abbreviated as "PCIe") standards is provided in the lower housing 3.

Figure 2:
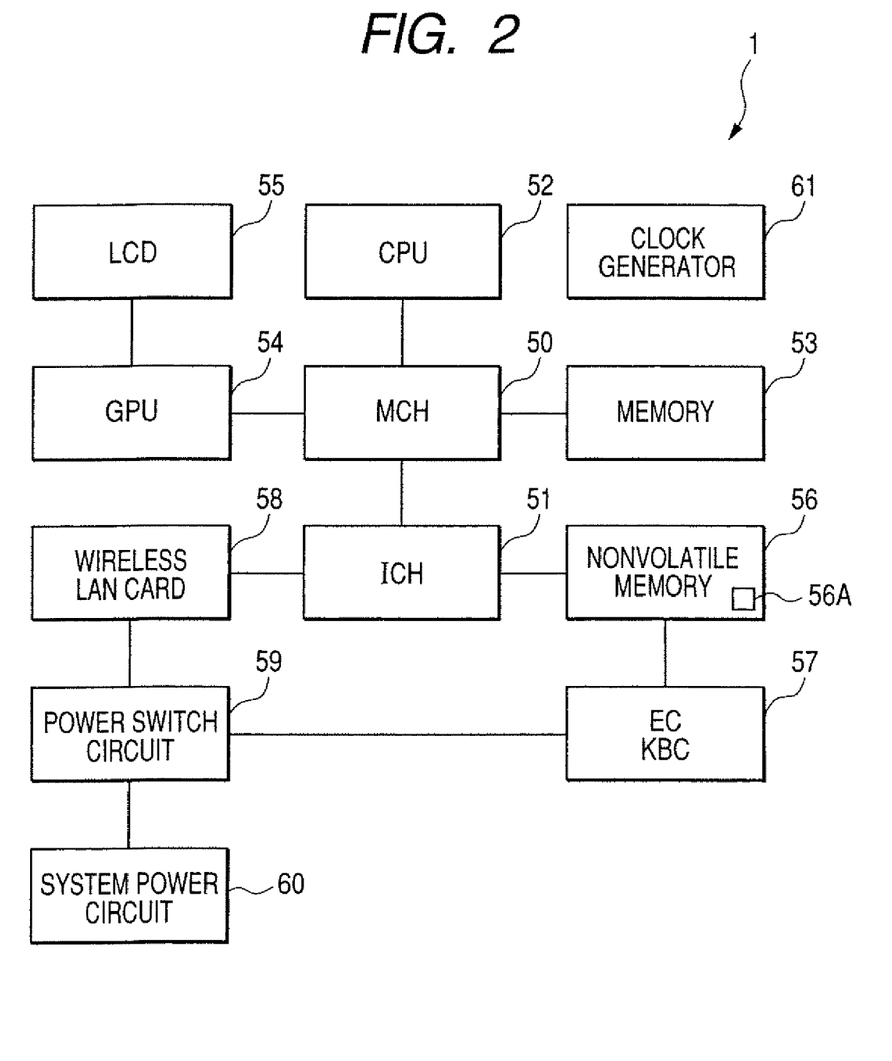
FIG. 2 is a schematic view showing the configuration of the PC of the embodiment of the present invention.

FIG. 2 is a schematic diagram showing the configuration of the PC of the embodiment of the present invention.

The PC 1 includes an memory controller hub (MCH) 50 for primarily establishing a connection between memory and the central processing unit (CPU); an input/output controller hub (ICH) 51 which connected to the MCH 50 by means of a dedicated bus and which establishes a connection with a PCIe or a universal serial bus (USB); a CPU 52 for controlling individual sections; memory 53 which assists processing performed by the CPU 52 by means of temporarily storing information; a graphics processing unit (GPU) 54 for primarily processing information about images; and an liquid-crystal display (LCD) 55 serving as the display section 20. The PC 1 further includes nonvolatile memory 56 for retaining a BIOS 56A; an embedded controller/keyboard controller (EC/KBC) 57 for controlling inputting of a built-in system which primarily controls the BIOS and inputting of the keyboard; a wireless LAST card 58 which is connected to the ICH 51 by means of the PCIe standards, to thus establish communication; a power switch circuit 59 for controlling power supplied to individual sections; a system power circuit 60 which generates a voltage to be taken as main power and auxiliary power and supplies power to the individual sections; and a clock generator 61 which generates a clock signal, thereby synchronizing the individual sections. The clock generator 61 is connected to individual sections which require a clock signal, and transmits a clock signal in response to a clock request.

Figure 3:
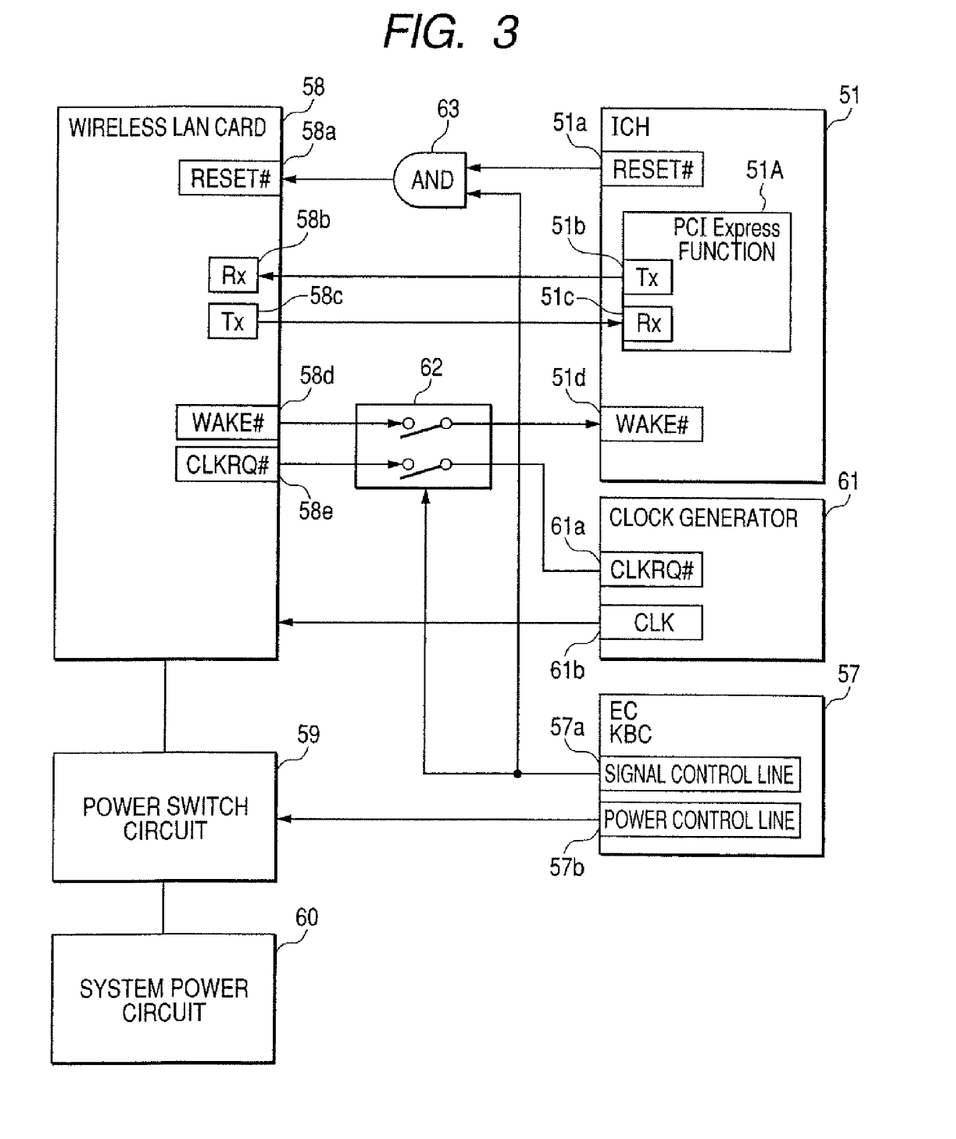
FIG. 3 is a schematic view showing transmission of signals in the PC of the embodiment of the present invention.

FIG. 3 is a schematic diagram showing transmission of signals in the PC of the embodiment of the present invention.

The wireless LAN card 58 includes a RESET #58a signal line which resets the wireless LAN card 58 upon receipt of a reset request from a logic circuit 63; an Rx58b signal line for receiving information from the ICH 51; a Tx58c signal line for transmitting information to the ICH 51; a WAKE#58d terminal for transmitting a wakeup request to the ICH 51; and a CLKRQ#58e transmitting a clock request to the clock generator 61. The WAKE#58d and the CLKRQ#58e are called sideband signals in correspondence with the Rx58b and the Tx58c signal lies which are main signal lines.

The wireless LAN card 58 synchronizes operation upon receipt of a clock signal from the clock generator 61. The wireless LAN card 58 is connected to the power switch circuit 59 and supplied with power.

The ICH 51 has a REST#51a signal line for transmitting a reset request to the logic circuit 63; a PCIe function 51A signal line having an Rx51C signal line for receiving information from the Tx51b and the Tx58 signal lines which transmit information to the Rx51b signal line of the wireless LAN card 58; and a WAKE#51d signal line for receiving, from the WAKE#58d signal line of the wireless LAN card 58, a wakeup request.

The clock generator 61 has a CLKRQ#61a signal line for receiving a clock signal which is a sideband signal from the CLKRQ#58e of the wireless LAN card 58, and a CLK61b signal line for transmitting a clock signal to the wireless LAN card 58.

The EC/KBC 57 has a signal control line 57a which transmits a control signal used for controlling activation/deactivation of the switch 62 and which transmits a signal as a reset signal to the logic circuit 63; and a power control line 57b which transmits a signal to the power switch circuit 59 and which controls a power supply to the wireless LAN card 58. Over an unillustrated signal line, the EC/KBC 57 transmits a command to the PCIe function 51A of the ICH 51, thereby switching the communication with the wireless LAN card 58 between an enable state and a disable state.

When the power control line 57b is in a Low level (hereinafter abbreviated as "L"), power is supplied to the wireless LAN card 58. When the power control line 57b is in a High level (hereinafter abbreviated as "H"), power to the wireless LAN card 58 is shut off.

The switch 62 controls connection or disconnection of a wakeup request signal and a clock request signal which serve as sideband signals transmitted from the wireless LAN card 58. Disconnection or connection of the signals is switched by a control signal transmitted from a signal control line 57a of the EC/KBC 57. When the signal control line 57a is L, the sideband signal is disconnected. When the signal control line 57a is H, the sideband signal is connected.

When the signal control line 57a is L, the logic circuit 63 transmits a reset signal from the RESET#51a of the ICH 51 to the RESET#58a of the wireless LAN card 58. When the signal control line 57a is H, the reset request is not transmitted.

Figure 4A:
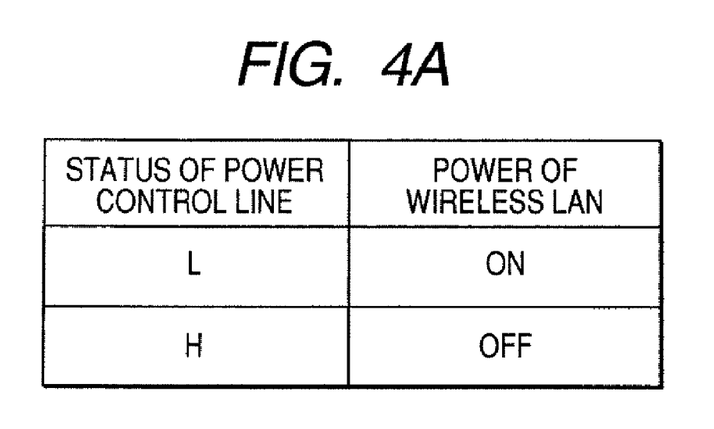
FIGS. 4A and 4B are tables showing correspondences between control and operation of the PC of the embodiment of the present invention.
Figure 4B:
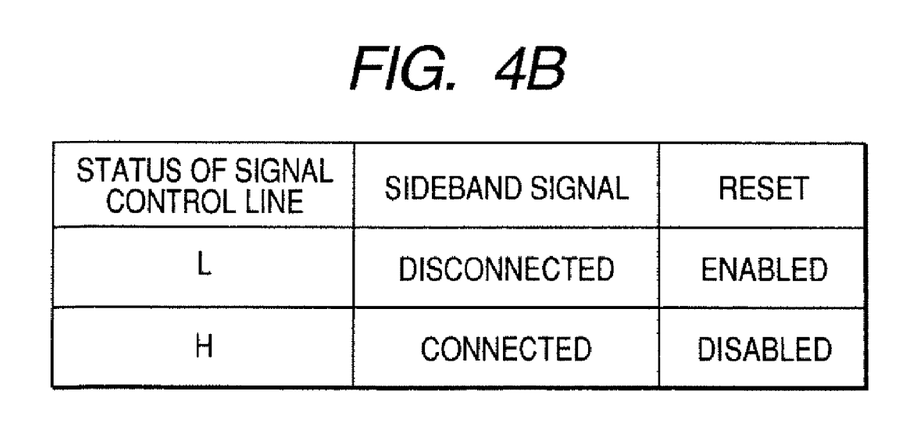

FIGS. 4A and 4B show tables representing correspondences between control and operation of the PC of the embodiment of the present invention.

FIG. 4A is a table showing correspondences between the state of the power control line 57b shown in FIG. 3 and a power supply state of the wireless LAN card 58. When the power control line 57b is L, the power switch circuit 59 supplies power to the wireless LAN card 58. When the power control line 57b is H, the power switch circuit 59 shuts off power to the wireless LAN card 58.

FIG. 4B is a table showing correspondences between the state of the signal control line 57a shown in FIG. 3, operation of the switch 62, and operation of the logic circuit 63. When the signal control line 57a is L, the switch 62 is turned off, thereby interrupting sideband signals communicated among the Rx58b and Tx58c signal lines of the wireless LAN card 58, the Tx51b and Rx51c signal lines of the ICH 51b. Moreover, the logic circuit 63 transmits, to the REST#58a of the wireless LAN card 58, a reset request transmitted by the RESET#51a of the ICH 51.

When the signal control line 57a is H, the switch 62 is turned on, there is connected the sideband signals communicated among the Tx58b and Tx58c signal lines of the wireless LAN card 58 and the Tx51b and Tx51c signal lines of the ICH 51. The logic circuit 63 does not transmit, to the RESET#58a of the wireless LAN card 58, the reset request transmitted by the RESET#51a of the ICH 51.

In summary, when the power control line 57b is L and when the signal control line 57a is H, the wireless LAN card 58 operates normally. When the power control line 57b is H and when the signal control line 57a is L, power to the wireless LAN card 58 is shut off, whereupon the sideband signals are interrupted and the reset request becomes enabled. Specifically, the wireless LAN card 58 is reset, to thus become separated from surrounding individual sections and electrically disconnected.

Figure 5A:
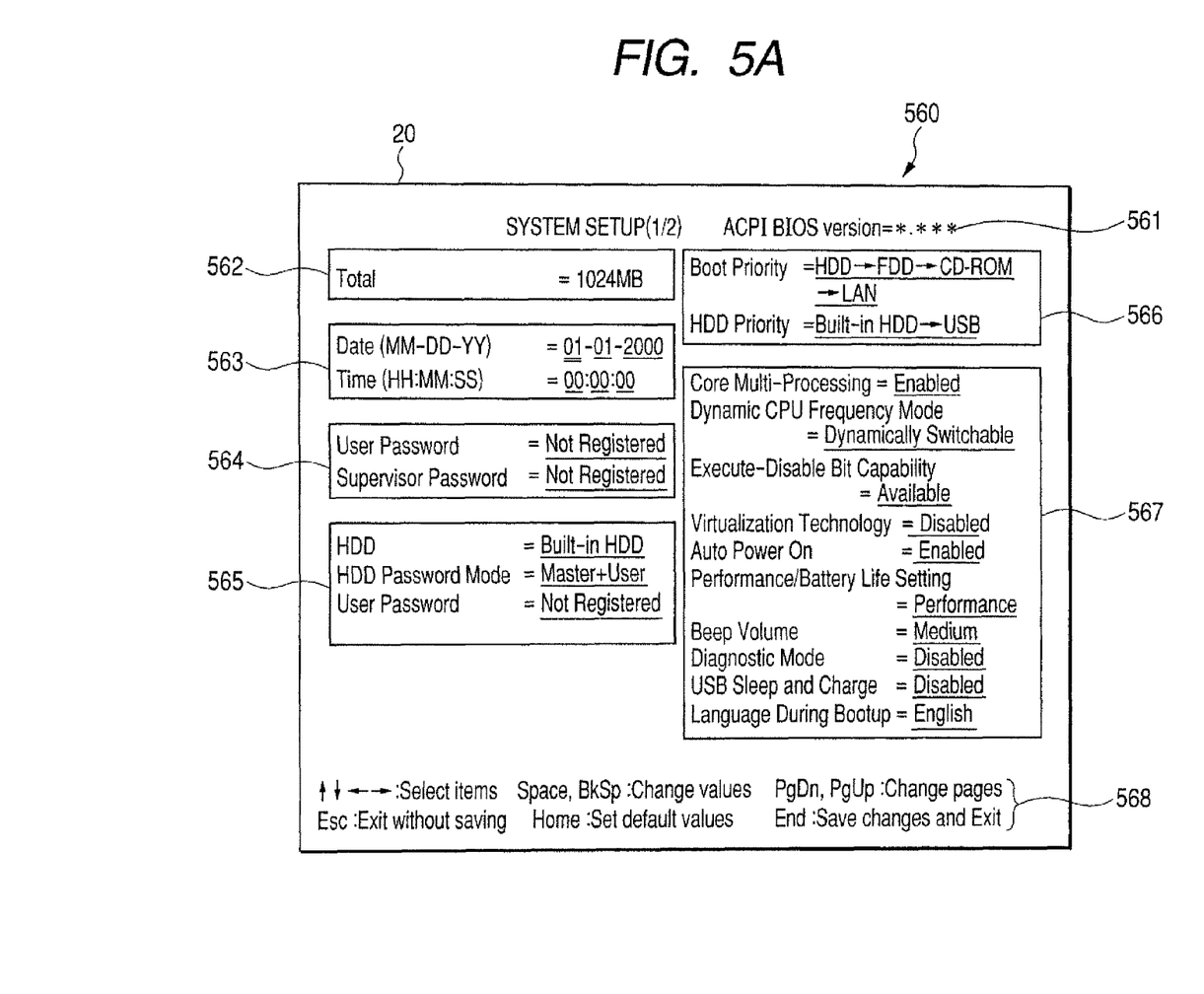
FIGS. 5A and 5B are schematic views showing a BIOS setup screen of the PC of the embodiment of the present invention.
Figure 5B:
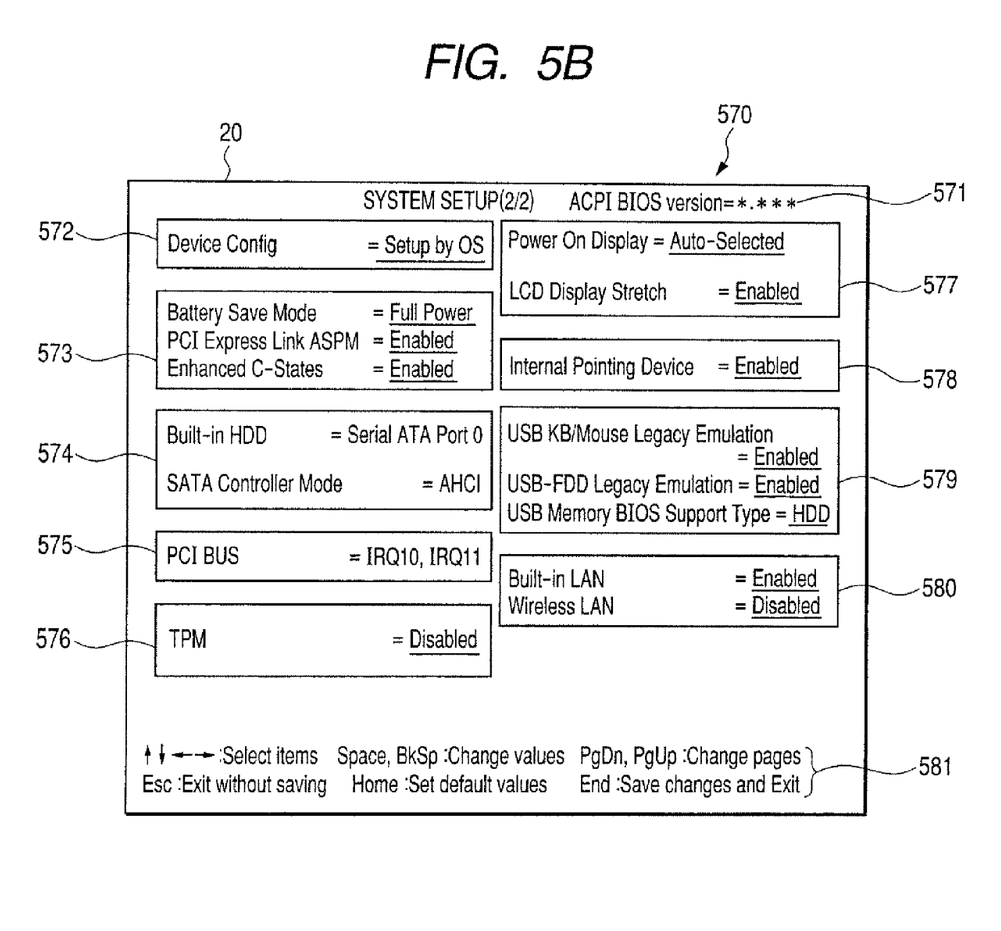

FIGS. 5A and 5B are schematic diagrams showing a BIOS setup screen of a PC of the embodiment of the present invention.

As shown in FIG. 5A, a BIOS setup screen 560 appearing on the display section 20 is made up of version information 561 showing version information about a BIOS conforming to an ACPI (Advanced Configuration and Power Interface); memory capacity 562 showing the size of the memory 53 set in the PC 1; a date setting 563 for setting a date of an internal clock of the PC 1; a password setting 564 for setting a password of the user and a password of an administrator; an HDD setting 565 for setting the name and security of an HDD (not shown) incorporated in the PC 1; a priority setting 566 for setting the degree of priority of a medium which is the source of startup and the degree of priority of an HDD which is the source of startup; a processing setting 567 for setting dispersion processing of a CPU, power consumption of a CPU, a function for automatically switching power consumption and a frequency of a CPU; an execute disable bit function, virtualization technology, automatic power-on, battery consumption, a beep sound, a diagnosis mode, a power supply to a USB device in a sleep mode, and a language employed at power-on; and an operation guide 568 for operating BIOS setup by way of the keyboard 32.

As shown in FIG. 5B, the BIOS setup screen 570 appearing on the display section 20 includes version information 571 showing version information about a BIOS complying with an ACPI (Advanced Configuration and Power Interface); a device setting 572 for setting a device to be initialized by the BIOS at power on; a power management setting 573 for setting a battery save mode, an ASPM of the PCIe, and an enhanced C state; a hard disk setting 574 for displaying a destination to which an HDD is to be connected and a connection mode of the HDD; a PCI setting 575 for displaying an interrupt level of the PCI bus; a security setting 576 for setting a TPM; a display setting 577 for setting a display and a display function which are to be displayed; a pointing device setting 578 for setting whether or not the track pad 33a is used; a USB setting 579 for setting legacy emulation of a USB keyboard, a USB mouse, and a USB Floppy (Registered Trademark); an LAN setting 580 for setting use or nonuse of a built-in LAN card and the set wireless LAN card 58; and an operation guide 581 for use in operating BIOS setup by way of the keyboard 32.

The present embodiment describes a case where the "Wireless LAN" of the LAN setting 580 is set to "Disabled"; namely, where the wireless LAN card 58 is set to be disabled.

Operation of the PC of the embodiment of the present invention will be described hereunder by reference to the drawings.

When started in a BIOS setup mode, the PC 1 displays, on the display section 20, the BIOS setup screens 560 and 570 shown in FIGS. 5A and 5B. When the wireless LAN card 58 is not used, the user operates the keyboard 32 in accordance with the operation guide 581, to thus set the "Wireless LAN" of the LAN setting 580 to "Disabled," thereby bringing the wireless LAN card 58 into a disable state.

The PC 1 is activated by means of depression of the power switch 31, whereupon the system power circuit 60 and the power switch circuit 59 starts supplying power to individual sections. First, the EC/KBC 57 reads settings of the BIOS 56A. After having performed operation, which will be described below by reference FIG. 6, the EC/KBC 57 initiates an OS (unillustrated Operating System) stored in the HDD.

Figure 6:
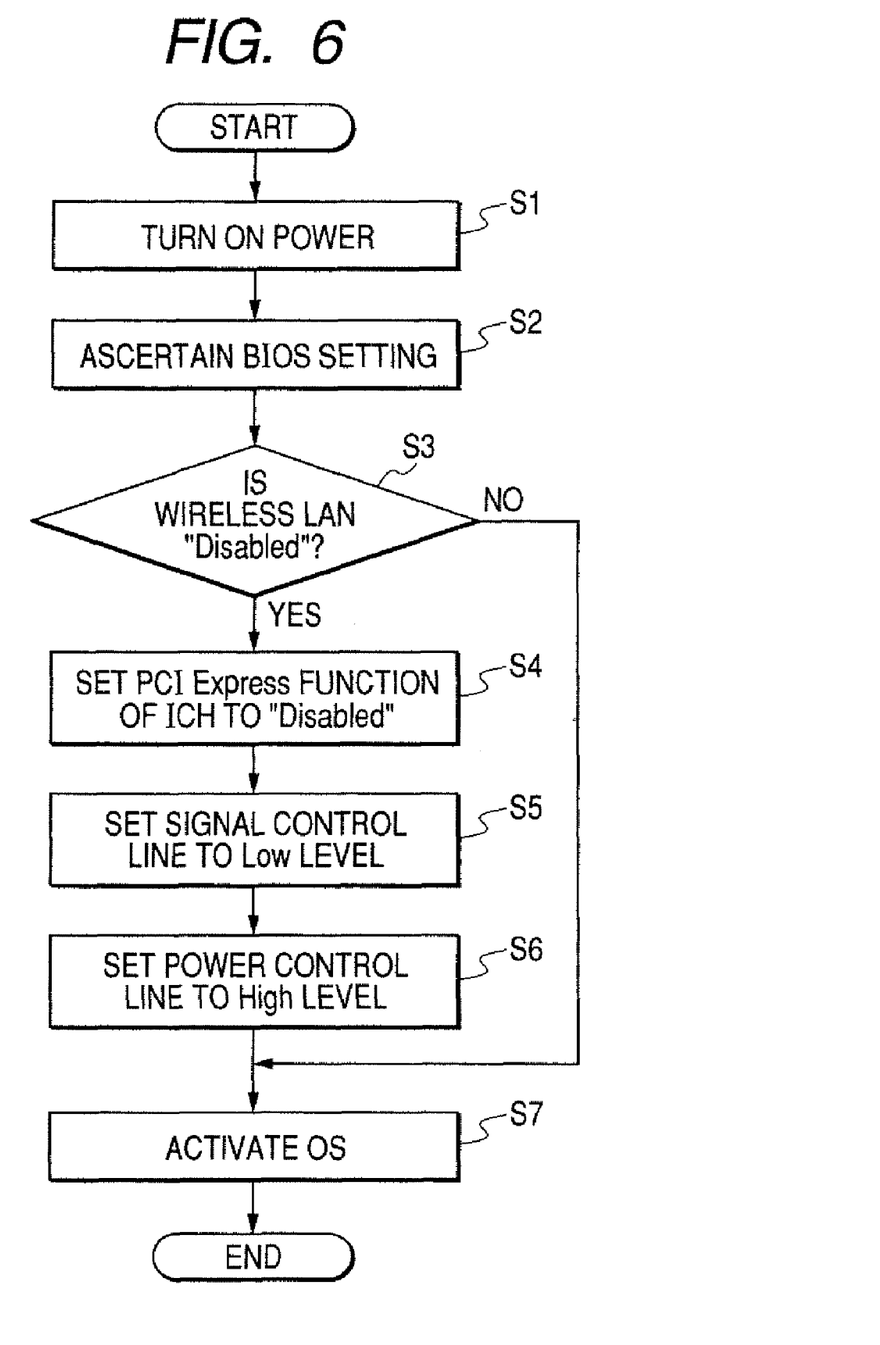
FIG. 6 is a flowchart showing operation of the PC of the embodiment of the present invention.

FIG. 6 is a flowchart showing operation of the PC of the embodiment of the present invention.

First, when the power switch 31 is depressed, the power switch 59 and the system power circuit 60 supply power to the individual sections (S1). Next, the EC/KBC 57 reads the BIOS 56A retained in the nonvolatile memory 56, to thus ascertain the LAN setting 580 (S2).

When the "Wireless LAN" of the LAN setting 580 is "Disabled" (Yes in S3), the EC/KBC 57 transmits a command to the ICH 51, thereby setting the PCIe function 51A to the "Disabled" and disabling communication with the Tx51b, Rx51c and Rx58b, Tx58c (S4). Next, the signal control line 58a is brought into an L state, thereby turning off the switch 62 and bringing the reset request RESET#51a into an enabled state (S5). Next, the power control line 57b is brought into an H state, thereby interrupting the power supply from the power switch circuit 59 to the wireless LAN card 58 (S6). Connection and power of the wireless LAN card 58 are disabled, to thus start the OS (S7).

When the "Wireless LAN" of the LAN setting 580 is "Enabled" (No in S3), the EC/KBC 57 establishes connection of the wireless LAN card 58 as in normal times, to thus turn on power and activate the OS (S7).

According to the above-mentioned embodiment, the sideband signals of the wireless LAN card 58 connected by means of the PCIe standards according to the setting of the BIOS 56A, thereby disconnecting power to the wireless LAN card 58. The OS is started by means of electrical disconnection of the wireless LAN card 58, and hence a power saving effect is enhanced when compared with a case where the wireless LAN card 58 remaining connected is brought into a D3 state (a standstill state) defined by the ACPI. Specifically, power of the order of about 50 mW is curtailed.

The embodiment is not limited solely to the wireless LAN card 58 but can also be applied to a PCIe device connected by means of PCIe standards as well as a device connected to the Mini PCI Express slot 30. Similar effects can be yielded.

The configuration, connection mode, control method, and BIOS setting items of the PC 1 provided in the present embodiment are mere examples and can be modified without departing from the gist of the present invention. For instance, the embodiment may also be practiced by means of controlling the power switch circuit 59, the switch 62, and the logic circuit 63 on an OS scale or an application scale instead of controlling the BIOS 56A.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device comprising:
   a first switch which switches between connection and disconnection of a signal line for receiving a sideband signal transmitted from a device attached to the electronic device;
   a second switch which switches supply and interrupt of power to the device independently from other components in the electronic device;
   a nonvolatile memory which holds a setting, the setting indicating whether the device is to be enabled or disabled; and
   a control section which controls the first switch and the second switch based on the setting at power-on of the electronic device, wherein, when the setting indicates that the device is to be disabled, the control section causes the second switch to interrupt power to the device.

2. The electronic device according to claim 1, wherein when the setting indicates that the device is to be disabled, the control section causes the first switch to disconnect the signal line for receiving the sideband signal transmitted from the device.

3. The electronic device according to claim 1, wherein the setting is a setting of a basic input/output system.

4. The electronic device according to claim 1, wherein the device is attached to the electronic device in conformance with PCI Express standards and the first switch disconnects the sideband signal in conformance with PCI Express standards.

5. The electronic device according to claim 1, further comprising:
   a logic circuit which switches between permitting and inhibiting transmission of a reset signal to the device, wherein the control section causes the logic circuit to inhibit transmission of the reset signal to the device when the setting indicates that the connected device is disabled.

6. A method for powering on an electronic device that includes a connected device, the method comprising:
   providing, by a switch, connection and disconnection of a signal line for receiving a sideband signal transmitted to the electronic device;
   supplying power to the electronic device by a power switch;
   reading a setting held in nonvolatile memory responsive to the supplying power, the setting indicating whether the connected device is enabled or disabled; and
   controlling the switch and the power switch based on the setting, the controlling includes interrupting, by the power switch, a power supply exclusively to the connected device when the setting indicates that the connected device is disabled while other devices within the electronic device are continued to be supplied power.

7. The power supply method according to claim 6, wherein the setting is a setting of a basic input/output system.

8. The power supply method according to claim 6, further comprising disconnecting a sideband signal transmitted from the connected device to the electronic device when the setting indicates that the connected device is disabled.

9. The power supply method according to claim 8, wherein the connected device is a PCI Express device and the disconnecting the sideband signal is performed based on PCI Express standards.

* * * * *